(12) United States Patent
Steinhauser et al.

(10) Patent No.: US 8,173,741 B2
(45) Date of Patent: May 8, 2012

(54) RUBBER MIXTURES WITH FUNCTIONALIZED DIENE RUBBERS AND WITH MICROGELS, A PRODUCTION PROCESS, AND USE OF THE MIXTURES

(75) Inventors: Norbert Steinhauser, Monheim (DE); Werner Obrecht, Moers (DE); David Hardy, Dormagen (DE); Thomas Groβ, Wülfrath (DE)

(73) Assignee: LANXESS Deutschland GmbH, Leverkusen (DE)

( * ) Notice: Subject to any disclaimer, the term of this patent is extended or adjusted under 35 U.S.C. 154(b) by 42 days.

(21) Appl. No.: 12/579,452

(22) Filed: Oct. 15, 2009

(65) Prior Publication Data

US 2010/0152370 A1    Jun. 17, 2010

(30) Foreign Application Priority Data

Oct. 20, 2008 (DE) .................. 10 2008 052 116

(51) Int. Cl.
- *C08C 19/00* (2006.01)
- *C08C 19/44* (2006.01)
- *C08L 9/00* (2006.01)
- *C08L 9/06* (2006.01)

(52) U.S. Cl. .................. 524/572; 524/502; 525/242
(58) Field of Classification Search .................. 524/502, 524/572; 525/242
See application file for complete search history.

(56) References Cited

U.S. PATENT DOCUMENTS

| | | | |
|---|---|---|---|
| 5,124,408 A | 6/1992 | Engels et al. | |
| 5,227,425 A | 7/1993 | Rauline | |
| 5,395,891 A | 3/1995 | Obrecht et al. | |
| 6,127,488 A * | 10/2000 | Obrecht et al. | 525/333.3 |
| 6,365,668 B1 | 4/2002 | Scholl et al. | |
| 6,605,671 B2 | 8/2003 | Obrecht | |
| 8,084,547 B2 * | 12/2011 | Obrecht | 525/332.6 |
| 2004/0166317 A1 | 8/2004 | Obrecht et al. | |
| 2005/0256284 A1 | 11/2005 | Kerns et al. | |
| 2006/0254734 A1 | 11/2006 | Hannay et al. | |
| 2008/0108755 A1 | 5/2008 | Heiliger et al. | |
| 2008/0295935 A1 * | 12/2008 | Kobayashi et al. | 152/209.1 |

FOREIGN PATENT DOCUMENTS

| | | |
|---|---|---|
| DE | 102007020451 A1 | 10/2008 |
| DE | 102008023885 A1 | 11/2009 |
| EP | 0334042 B1 | 11/1993 |
| EP | 0447066 B1 | 5/1996 |
| EP | 1520732 A1 | 4/2005 |
| EP | 1318172 B1 | 6/2006 |
| EP | 1902865 A1 | 3/2008 |
| GB | 1078400 | 8/1964 |
| WO | WO 2008/132061 | * 11/2008 |

OTHER PUBLICATIONS

European Search Report from co-pending Application EP09173093 dated Jan. 4, 2010.
I Franta, Elsevier, 1989, Studies in Polymer Science, 1, Elastomers and Rubber Compounding Materials, Manufacture, Properties and Applications pp. 86-92.
Houben-Weyl, Methoden der Organischen Chemie, 4th Edition, vol. 14/2, pp. 848-850.

* cited by examiner

*Primary Examiner* — James J Seidleck
*Assistant Examiner* — Deve E Valdez
(74) *Attorney, Agent, or Firm* — Nicanor A. Kohncke

(57) ABSTRACT

The present invention relates to rubber mixtures with functionalized diene rubbers and with microgels, to a production process, and to the use of the mixtures for the production of low-abrasion motor-vehicle tires which have wet-slip resistance and which have low rolling resistance.

5 Claims, No Drawings

RUBBER MIXTURES WITH FUNCTIONALIZED DIENE RUBBERS AND WITH MICROGELS, A PRODUCTION PROCESS, AND USE OF THE MIXTURES

FIELD OF THE INVENTION

The present invention relates to rubber mixtures with functionalized diene rubbers and with microgels, to a production process, and to the use of the mixtures for the production of high-abrasion resistance motor-vehicle tyres which have wet-slip resistance and which have low rolling resistance.

BACKGROUND OF THE INVENTION

An important property desired in tyres is good adhesion to dry and wet surfaces. It is very difficult here to improve the slip resistance of a tyre without simultaneously impairing rolling resistance and abrasion. Low rolling resistance is important for low fuel consumption, and high abrasion resistance is the decisive factor for high tyre lifetime.

The slip resistance and the rolling resistance of a tyre depend largely on the dynamic mechanical properties of the rubbers used to construct the tyre. In order to lower rolling resistance, rubbers used for the tyre tread have high rebound resilience at relatively high temperatures (from 60° C. to 100° C.). On the other hand, rubbers which are advantageous for improving wet-slip resistance have a high damping factor at low temperatures (0° C.) and, respectively, low rebound resilience in the range from 0° C. to 23° C. To obtain compliance with this complex requirements profile, mixtures composed of various rubbers are used in the tread. The usual method is to use mixtures composed of one or more rubbers with relatively high glass transition temperature, e.g. styrene-butadiene rubber, and of one or more rubbers with relatively low glass transition temperature, e.g. polybutadiene having high 1,4-cis content or, respectively, a styrene-butadiene rubber having low styrene content and very low vinyl content, or a polybutadiene produced in solution, having low vinyl content.

Anionically polymerized solution rubbers containing double bonds, e.g. solution polybutadiene and solution styrene-butadiene rubbers, have advantages over corresponding emulsion rubbers for the production of low-rolling-resistance tyre treads. The advantages are found inter alia in the controllability of vinyl content and in the glass transition temperature associated with this, and in the branching within the molecule. The result in practice is particular advantages in the relationship between the wet-slip resistance and rolling resistance of the tyre. By way of example, U.S. Pat. No. 5,227,425 describes the production of tyre treads from a solution SBR and silica. Numerous end-group-modification methods have been developed in order to obtain a further improvement in properties, as described by way of example in EP-A 334 042 using dimethyl-aminopropylacrylamide, or as described in EP-A 447 066, using silyl ethers. However, the proportion by weight of the end groups is very small, by virtue of the high molecular weight of the rubbers, and the end groups can therefore have only a small effect on the interaction between filler and rubber molecule. EP-A 1 000 971 discloses relatively highly-functionalized copolymers containing carboxy groups and composed of vinylaromatics and of dienes, having up to 60% content of 1,2-bonded diene (vinyl content). US 2005/0 256 284 A1 describes copolymers composed of diene and of functionalized vinylaromatic monomers. The disadvantage of the said copolymers lies in the complicated synthesis of the functionalized vinylaromatic monomers and in the greatly restricted selection of the functional groups, because the only functional groups that can be used are those which do not enter into any reaction with the initiator during the anionic polymerization reaction. In particular, it is impossible to use functional groups which have hydrogen atoms which are capable of forming hydrogen bonds and which are therefore capable of forming particularly advantageous interactions with the filler in the rubber mixture.

The literature describes a wide variety of measures for the reduction of rolling resistance of tyres, and these include the use of polychloroprene gels (EP-A 405 216) and of polybutadiene gels (DE-A 42 20 563) in tyre treads composed of rubbers containing carbon-carbon double bonds. Disadvantages in the use of polychloroprene gel are found in the high price of the rubber, the high density of the polychloroprene, and the environmental disadvantages likely to arise because of the chlorine-containing component during the process for recycling of used tyres. Polybutadiene gels according to DE-A 42 20 563 do not exhibit the said disadvantages, but dynamic damping is lowered here not only at low temperatures (from −20 to +20° C.) but also at relatively high temperatures (from 40 to 80° C.), and this leads in practice to advantages in rolling resistance but to disadvantages in the wet-slip performance of the tyres. Sulphur-crosslinked rubber gels according to GB Patent 1 078 400 exhibit no reinforcing action and are therefore unsuitable for the present application.

It was therefore an object to provide rubber mixtures which do not have the disadvantages of the prior art.

Surprisingly, it has now been found that the rubber mixtures according to the invention, comprising (A) at least one functionalized diene rubber having a polymer chain composed of repeat units based on at least one diene and optionally composed of one or more vinylaromatic monomers, and (B) at least one styrene/butadiene rubber gel with a swelling index in toluene of from 1 to 25 and with a particle size of from 5 to 1000 nm and also (C) if appropriate further rubbers, fillers and rubber auxiliaries, have high dynamic damping at low temperature and very low dynamic damping at a relatively high temperature, thus giving not only advantages in rolling resistance but also advantages in wet-slip performance, and also in relation to abrasion.

SUMMARY OF THE INVENTION

The invention therefore provides rubber mixtures, comprising (A) at least one functionalized diene rubber having a polymer chain composed of repeat units based on at least one diene and optionally composed of one or more vinylaromatic monomers, and (B) at least one styrene/butadiene rubber gel with a swelling index in toluene of from 1 to 25 and with a particle size of from 5 to 1000 nm and also (C) if appropriate further rubbers, fillers and rubber auxiliaries.

Dienes in the functionalized diene rubber (A) are preferably 1,3-butadiene, isoprene, 1,3-pentadiene, 2,3-dimethylbutadiene, 1-phenyl-1,3-butadiene and/or 1,3-hexadiene. It is particularly preferable to use 1,3-butadiene and/or isoprene.

Preferred vinylaromatic monomers for the purposes of the invention are styrene, o-, m- and/or p-methylstyrene, p-tert-butylstyrene, α-methylstyrene, vinylnaphthalene, divinylbenzene, trivinylbenzene and/or divinylnaphthalene. It is particularly preferable to use styrene.

DETAILED DESCRIPTION OF THE INVENTION

In one preferred embodiment of the invention, the functionalized diene rubbers (A) have from 0 to 60% by weight, preferably from 15 to 45% by weight, content of copolymerized vinylaromatic monomers, and from 40 to 100% by weight, preferably from 55 to 85% by weight, content of dienes, where the content of 1,2-bonded dienes (vinyl content) in the dienes is from 0.5 to 95% by weight, preferably from 10 to 85% by weight, and the entirety of copolymerized vinylaromatic monomers and dienes is 100%.

The functionalized diene rubbers (A) are particularly preferably composed of from 40 to 100% by weight of 1,3-butadiene and from 0 to 60% by weight of styrene, where the proportion of bonded functional groups and/or salts of these is from 0.02 to 5% by weight, based on 100% by weight of diene rubber.

Examples of functional groups and/or salts of these in the functionalized diene rubber are carboxy, hydroxy, amine, carboxylic ester, carboxamide or sulphonic acid groups. Preference is given to carboxy groups or hydroxy groups. Preferred salts are alkali metal carboxylates, alkaline earth metal carboxylates, zinc carboxylates and ammonium carboxylates, and also alkali metal sulphonates, alkaline earth metal sulphonates, zinc sulphonates and ammonium sulphonates.

In one very particularly preferred embodiment of the invention, (A) is a functionalized diene rubber composed of repeat units based on 1,3-butadiene and styrene, where the rubber has been functionalized using hydroxy and/or carboxy groups.

The functionalized diene rubbers (A) here are preferably produced, as described by way of example in DE 102008023885.6, via polymerization of dienes and, if appropriate, of vinylaromatic polymers, in solution, followed by introduction of functional groups.

Styrene/butadiene rubber gels (B) are migrogels produced via crosslinking of

SBR—styrene/butadiene copolymers having styrene contents of from 0 to 100% by weight, preferably from 10 to 60% by weight, and/or XSBR—styrene/butadiene copolymers and graft polymers with further polar unsaturated monomers, such as acrylic acid, methacrylic acid, acrylamide, methacrylamide, N-methoxymethylmethacrylamide, N-acetoxymethylmethacrylamide, acrylonitrile, dimethylacrylamide, hydroxyethyl acrylate, hydroxypropyl acrylate, hydroxybutyl acrylate, hydroxyethyl methacrylate, hydroxypropyl methacrylate, hydroxybutyl methacrylate, ethylene glycol dimethacrylate, butanediol dimethacrylate, trimethylolpropane trimethacrylate, pentaerythritol tetramethacrylate, having styrene contents of from 0 to 99% by weight and with contents of from 1 to 25% by weight of copolymerized polar monomers.

Among the styrene/butadiene rubber gels (B), particular preference is given to XSBR-styrene/butadiene copolymers or graft polymers containing hydroxyethyl methacrylate, hydroxypropyl methacrylate, hydroxybutyl methacrylate, ethylene glycol dimethacrylate, trimethylolpropane trimethacrylate and/or pentaerythritol tetramethacrylate, as polar unsaturated monomers.

The term copolymers also encompasses the polymers composed of 2 or more monomers.

The styrene/butadiene rubber gels have a particle size of from 5 to 1000 nm, preferably from 20 to 400 nm (DVN value to DIN 53 206) and swelling indices ($Q_i$) in toluene of from 1 to 25, preferably from 1 to 20. The swelling index is calculated from the weight of the solvent-containing gel (after centrifugation at 20 000 rpm) and the weight of the dry gel:

$Q_i$ wet weight of gel/dry weight of gel.

To determine the swelling index, by way of example, 250 mg of SBR gel are swollen for 24 hours in 25 ml of toluene, with shaking. The gel is isolated by centrifugation and weighed and then dried to constant weight at 70° C. and again weighed.

In one preferred embodiment, the styrene/butadiene rubber gels (B) involve XSBR-styrene/butadiene copolymers having a content of from 20 to 50 mg KOH/g of hydroxy groups. The hydroxy group content of the styrene/butadiene rubber gels (B) is determined here via reaction with acetic anhydride and titration of the resultant liberated acetic acid with KOH to DIN 53240, in the form of hydroxy number with the dimension mg KOH/g of polymer.

The styrene/butadiene rubber starting products are preferably produced via emulsion polymerization, in which connection see by way of example I. Franta, Elastomers and Rubber Compounding Materials, Elesevier, Amsterdam 1989, pages 88 to 92.

The crosslinking of the rubber starting products to give styrene/butadiene rubber gels (B) takes place in the latex state and can take place either during the polymerization reaction via copolymerization with polyfunctional monomers, and continuation of the polymerization reaction up to high conversions, or by the monomer-feed process, via polymerization using high internal conversions, or, following the polymerization reaction, via post-crosslinking, or else via a combination of the two processes. Another possibility is production via polymerization in the presence of regulators, e.g. thiols.

In the case of crosslinking of the styrene/butadiene rubber via copolymerization with polyfunctional compounds having crosslinking action, it is preferable to use polyfunctional comonomers having at least two, preferably from 2 to 4, copolymerizable carbon-carbon double bonds, examples being diisopropenylbenzene, divinylbenzene, divinyl ether, divinyl sulphone, diallyl phthalate, triallyl cyanurate, triallyl isocyanurate, 1,2-polybutadiene, N,N'-m-phenylenemaleinimide and/or triallyl trimellitate. Other compounds that can be used are: the acrylates and methacrylates of polyhydric, preferably di- to tetrahydric, $C_2$-$C_{10}$ alcohols, such as ethylene glycol, 1,2-propanediol, butanediol, hexanediol, polyethylene glycol having from 2 to 20, preferably from to 8, oxyethylene units, neopentyl glycol, bisphenol A, glycerol, trimethylolpropane, pentaerythritol, sorbitol, and unsaturated polyesters composed of aliphatic di- and polyols, and also maleic acid, fumaric acid and/or itaconic acid. The amount used of the polyfunctional compounds is preferably from 0.5 to 15% by weight, particularly preferably from 1 to 10% by weight, based on the entire monomer mixture.

The crosslinking of the styrene/butadiene rubbers to give SBR-rubber gels can also take place in latex form via post-crosslinking using chemicals having crosslinking effect. Examples of suitable chemicals having crosslinking effect are organic peroxides, e.g. dicumyl peroxide, t-butyl cumyl peroxide, bis(tert-butylperoxyisopropyl)benzene, di-tert-butyl peroxide, dibenzoyl peroxide, bis(2,4-dichlorobenzoyl) peroxide, tert-butyl perbenzoate, and also organic azo compounds, such as azobisisobutyronitrile and azobiscyclohexanonitrile, and also di- and polymercapto compounds, such as dimercaptoethane, 1,6-dimercaptohexane, 1,3,5-trimercaptotriazine, and mercapto-terminated polysulphide rubbers, such as mercapto-terminated reaction products of bis-chloroethyl formal with sodium polysulphide. The ideal temperature for carrying out the post-crosslinking reaction is naturally dependent on the reactivity of the crosslinking agent. This reaction can be carried out at temperatures from room temperature up to about 170° C., if appropriate at an elevated pressure, in which connection see Houben-Weyl, Methoden der organischen Chemie [Methods of Organic Chemistry], 4th edition, volume 14/2, page 848.

Peroxides are particularly preferred crosslinking compositions. In this regard reference si made, for example, to EP-A 1 307 504.

If appropriate, a particle enlargement may also be carried out by agglomeration, before, during or after the past-crosslinking in latex form.

Styrene/butadiene rubbers which have been produced in organic solvents can also serve as starting materials for the production of the styrene/butadiene rubber gels. In this case it is advisable to emulsify the solution of the rubber in water, if appropriate with the aid of an emulsifier, and to crosslink the resultant emulsion subsequently, using suitable crosslinking agents, prior to or after removal of the organic solvent. Suitable crosslinking agents are the abovementioned crosslinking agents.

In one preferred embodiment of the invention, the proportion of the styrene/butadiene rubber gel (B), based on 100 parts by weight of the total amount of rubber, is from 1 to 100 parts by weight, particularly preferably from 5 to 75 parts by weight. The term total amount encompasses not only the functionalized diene rubber but also any abovementioned rubbers that may be present.

The rubber mixtures according to the invention can comprise not only the functionalized diene rubbers (A) mentioned and the styrene/butadiene rubber gel (B) but also, as component (C), other rubbers, such as natural rubber or else other synthetic rubbers. The amount of these, if they are present, is usually in the range from 0.5 to 85% by weight, preferably from 10 to 75% by weight, based on the entirety of rubber in the rubber mixture. The amount of additionally added rubbers depends in turn on the respective intended use of the rubber mixtures according to the invention.

Examples of additional rubbers are natural rubber and synthetic rubber.

Synthetic rubbers known from the literature are listed here by way of example. They encompass inter alia
BR—polybutadiene
ABR—butadiene/$C_1$-$C_4$-alkyl acrylate copolymers
IR—polyisoprene
E-SBR—styrene-butadiene copolymers having styrene contents of from 1 to 60% by weight, preferably from 20 to 50% by weight, produced via emulsion polymerization
IIR—isobutylene-isoprene copolymers
NBR—butadiene-acrylonitrile copolymers having acrylonitrile contents of from 5 to 60% by weight, preferably from 10 to 40% by weight
HNBR— partially hydrogenated or fully hydrogenated NBR rubber
EPDM—ethylene-propylene-diene terpolymers
and also mixtures of the said rubbers. Materials of interest for the production of motor-vehicle tyres are in particular natural rubber, E-SBR, and also solution SBR with glass transition temperature above -50° C., polybutadiene rubber having high cis-content (>90%), produced using catalysts based on Ni, Co, Ti or Nd, and also polybutadiene rubber having vinyl content of up to 80%, and also mixtures of these.

Fillers which can be used for the rubber mixtures according to the invention are any of the fillers known for use in the rubber industry. These encompass both active fillers and inert fillers.

Examples that may be mentioned are:
fine-particle silicas, produced by way of example via precipitation from solutions of silicates, or flame hydrolysis of silicon halides with specific surface areas of from 5 to 1000 $m^2$/g (BET surface area), preferably from 20 to 400 $m^2$/g, and with primary particle sizes of from 10 to 400 nm. The silicas can, if appropriate, also take the form of mixed oxides with other metal oxides, such as oxides of Al, of Mg, of Ca, of Ba, of Zn, of Zr, or of Ti;

synthetic silicates, such as aluminium silicate, or alkaline earth metal silicate, e.g. magnesium silicate or calcium silicate, with BET surface areas of from 20 to 400 $m^2$/g and with primary particle diameters of from 10 to 400 nm;

natural silicates, such as kaolin and any other naturally occurring form of silica;

glass fibres and glass-fibre products (mats, strands), or glass microbeads;

metal oxides, such as zinc oxide, calcium oxide, magnesium oxide, or aluminium oxide;

metal carbonates, such as magnesium carbonate, calcium carbonate, or zinc carbonate;

metal hydroxides, e.g. aluminium hydroxide or magnesium hydroxide;

metal sulphates, such as calcium sulphate, barium sulphate;

carbon blacks: the carbon blacks to be used here are carbon blacks produced by the flame-black process, channel-black process, furnace-black process, gas-black process, thermal-black process, or acetylene-black process, or arc processes, their BET surface areas being from 9 to 200 $m^2$/g, e.g. the following carbon blacks: SAF, ISAF-LS, ISAF-HM, ISAF-LM, ISAF-HS, CF, SCF, HAF-LS, HAF, HAF-HS, FF-HS, SPF, XCF, FEF-LS, FEF, FEF-HS, GPF-HS, GPF, APF, SRF-LS, SRF-LM, SRF-HS, SRF-HM and MT, or the following carbon blacks in accordance with ASTM: N110, N219, N220, N231, N234, N242, N294, N326, N327, N330, N332, N339, N347, N351, N356, N358, N375, N472, N539, N550, N568, N650, N660, N754, N762, N765, N774, N787 and N990;

rubber gels, in particular those based on polybutadiene and/or polychloroprene with particle sizes of from 5 to 1000 nm.

Preferred fillers used comprise fine-particle silicas and/or carbon blacks.

The fillers mentioned can be used alone or in a mixture. In one particularly preferred embodiment, the rubber mixtures comprise, as fillers, a mixture composed of pale-coloured fillers, such as fine-particle silicas, and of carbon blacks, where the mixing ratio of pale-coloured fillers to carbon blacks is from 0.01:1 to 50:1, preferably from 0.05:1 to 20:1.

The amounts used here of the fillers are in the range from 10 to 500 parts by weight, based on 100 parts by weight of rubber. It is preferable to use from 20 to 200 parts by weight.

In another embodiment of the invention, the rubber mixtures also comprise rubber aids which by way of example improve the processing properties of the rubber mixtures, or which serve for the crosslinking of the rubber mixtures, or which improve the physical properties of the vulcanizates produced from the rubber mixtures according to the invention, for the specific intended use of these, or which improve the interaction between rubber and filler or which serve for coupling of the rubber to the filler.

Examples of rubber auxiliaries are crosslinking agents, e.g. sulphur or sulphur-donor compounds, and also reaction accelerators, antioxidants, heat stabilizers, light stabilizers, antiozonants, processing aids, plasticisers, tackifiers, blowing agents, dyes, pigments, waxes, extenders, organic acids, silanes, retarders, metal oxides, extender oils, e.g. DAE (Distillate Aromatic Extract) oils, TDAE (Treated Distillate Aromatic Extract) oils, MES (Mild Extraction Solvates) oils, RAE (Residual Aromatic Extract) oils, TRAE (Treated Residual Aromatic Extract) oils, and naphthenic and heavy naphthenic oils, and also activators.

Examples of suitable silanes are the compounds described in EP A 1 318 172. Preferred silanes are sulphur-containing organosilicon compounds, such as bis(trialkoxysilylpropylpolysulphanes) of the following structural formula:

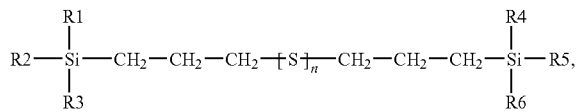

where n=from 2 to 6, its number average preferably being 2 or 4, and

R1-R6 are identical or different alkoxy moieties having from 1 to 12 carbon atoms, preferably methoxy and/or ethoxy. Products of this type are commercially available as Si 75 silane (n=2) and Si 69 silane (n=4) from Evonik.

The total amounts used of the sulphur-containing organosilicon compounds are advantageously from 0.2 phr to 12 phr, based on 100 parts by weight of total rubbers.

The total amount of rubber auxiliaries is in the range from 1 to 300 parts by weight, based on 100 parts by weight of total rubber. It is preferable to use from 5 to 150 parts by weight of rubber auxiliaries.

The invention further provides a process for the production of the rubber mixtures according to the invention, by at least one functionalized diene rubber being mixed with at least one styrene/butadiene rubber gel and, if appropriate, with further rubbers, fillers and rubber auxiliaries in a mixing apparatus at temperatures of from 20 to 220° C., in the abovementioned amounts.

The mixture can be produced in a single-stage process or in a multistage process, preference being given to from 2 to 3 mixing stages. Addition of sulphur and accelerator preferably takes place in the final mixing stage, e.g. on a roll, preferred temperatures here being in the range from 30 to 90° C.

Examples of assemblies suitable for production of the mixture are rolls, kneaders, internal mixers or mixing extruders.

The invention also provides the use of the rubber mixtures according to the invention for the production of rubber vulcanizates, especially for the production of tyres, in particular tyre treads.

The rubber mixtures according to the invention are also suitable for the production of mouldings, e.g. for the production of cable sheathing, or of flexible tubing, or of drive belts, conveyor belts, roll coverings, shoe soles, gasket rings and damping elements.

The examples below serve to illustrate the invention, without any resultant limiting effect.

Examples

Production of a Styrene/Butadiene Rubber Gel

For the compounding study, a styrene/butadiene rubber gel with Tg=−15° C. was used. This gel has an insoluble fraction of 95% by weight in toluene. The swelling index in toluene is 7.4. The hydroxy number is 32.8 mg KOH/g of gel.

The gel was produced via 12 hours of copolymerization of the following monomer mixture at 5° C. in the presence of 300 parts (based on the stated parts of monomer) of water, 4.5 parts of resin acid, 0.1 part of para-menthane hydroperoxide as initiator, 0.07 part of sodium ethylenediaminetetraacetate, 0.05 part of iron sulphate heptahydrate and 0.15 part of sodium formaldehyde sulphoxylate.

| Monomers | Quantitative proportions [parts by weight] |
|---|---|
| Butadiene | 44.5 |
| Styrenel | 46.5 |
| Trimethylolpropane trimethacrylate | 1.5 |
| Hydroxyethyl methacrylate | 7.5 |

The mixture was then heated, and residual monomers were removed via steam distillation at reduced pressure at a temperature of 70° C. 2 parts (based on 100 parts of product) of the antioxidant 2,6-di-tert-butyl-4-methylphenol, based on 100 parts of product, were then added.

The latex was then added to an aqueous solution of sodium chloride/sulphuric acid in order to bring about coagulation. The rubber crumbs were isolated, washed with water, and dried under reduced pressure at 50° C.

The rubber mixture used, as functionalized diene rubber, a styrene-butadiene rubber (SBR) constituted as follows:

Vinyl content: 46% by weight, based on oil-free rubber,
Styrene content: 24.5% by weight, based on oil-free rubber,
Mooney viscosity: 52 ME, determined as ML1+4 (100° C.) to DIN 53 523,
Oil content (TDAE oil): 29.1% by weight, based on oil-extended rubber,
COOH functionality: 35 meq./kg.

For comparison, the unfunctionalized styrene-butadiene rubber BUNA VSL 5025-2 was used, a product from Lanxess Deutschland GmbH (Lanxess), constituted as follows:

Vinyl content: 46% by weight, based on oil-free rubber,
Styrene content: 24% by weight, based on oil-free rubber,
Mooney viscosity: 50 ME, determined as ML1+4 (100° C.) to DIN 53 523,
Oil content (TDAE oil): 27.5% by weight, based on oil-extended rubber.

The constitutions of the rubber mixtures are collated in Table 1 below:

TABLE 1

| Starting materials in phr | Ex. 1 comp. | Ex. 2 comp. | Ex. 3 comp. | Ex. 4 inv. |
|---|---|---|---|---|
| BUNA VSL 5025-2 (unfunctionalized, comparison) | 96.3 | 96.3 | 0 | 0 |
| SBR (functionalized) | 0 | 0 | 97.6 | 97.6 |
| High-cis polybutadiene (BUNA ® CB 24, Lanxess) | 30 | 30 | 30 | 30 |
| Styrene-butadiene rubber gel | 0 | 15 | 0 | 15 |
| Silica (ULTRASIL ® 7000 GR, Evonik) | 90 | 90 | 90 | 90 |

TABLE 1-continued

| Starting materials in phr | Ex. 1 comp. | Ex. 2 comp. | Ex. 3 comp. | Ex. 4 inv. |
|---|---|---|---|---|
| Carbon black (VULCAN ® J/N375), Cabot | 7 | 7 | 7 | 7 |
| TDAE oil (VIVATEC ® 500, Hansen und Rosenthal) | 10 | 10 | 8.7 | 8.7 |
| Zinc soap (AKTIPLAST ® GT) RheinChemie Rheinau GmbH) | 3.5 | 3.5 | 3.5 | 3.5 |
| Stearic acid (EDENOR ® C 18 98-100), Cognis Deutschland GmbH | 1 | 1 | 1 | 1 |
| Antioxidant (VULKANOX ® 4020/LG, Lanxess) | 2 | 2 | 2 | 2 |
| Antioxidant (VULKANOX ® HS/LG, Lanxess) | 2 | 2 | 2 | 2 |
| Zinc oxide (ZINC WHITE ROTSIEGEL ®), Grillo Zinkoxid GmbH | 2 | 2 | 2 | 2 |
| Light-stabilizer wax (ANTILUX ® 654, RheinChemie Rheinau GmbH) | 2 | 2 | 2 | 2 |
| Silane ® (SI 69, Evonik) | 7.2 | 7.2 | 7.2 | 7.2 |
| Sulphonamide (VULKALENT ® E/C), Lanxess | 0.2 | 0.2 | 0.2 | 0.2 |
| Sulphur (MAHLSCHWEFEL 90/95 CHANCEL ®), Solvay Barium Strontium | 1.6 | 1.6 | 1.6 | 1.6 |
| N-tert-butyl-2-benzothiazolesulphenamide (VULKACIT ® NZ/EGC, Lanxess) | 1.6 | 1.6 | 1.6 | 1.6 |
| Diphenylguanidine (VULKACIT ® D/C, Lanxess) | 2.2 | 2.2 | 2.2 | 2.2 |

The abovementioned mixtures (without sulphur, N-tert-butyl-2-benzothiazolesulphenamide, diphenylguanidine, and also sulphonamide) were mixed in a first mixing stage in a 1.5 L kneader at 150° C. The mixture was then discharged and cooled to room temperature for 24 hours and, in a 2nd mixing step, reheated to 150° C. in the 1.5 L kneader. It was then cooled, and the mixture constituents sulphur and N-tert-butyl-2-benzothiazolesulphenamide, diphenylguanidine, and also sulphonamide were then admixed at from 40 to 60° C. on a roll.

The abovementioned mixtures were vulcanized in the press at 160° C. for 20 minutes. The properties of the corresponding vulcanizates are listed in Table 2.

TABLE 2

| Variable | Ex. 1 comp. | Ex. 2 comp. | Ex. 3 comp. | Ex. 4 inv. |
|---|---|---|---|---|
| Abrasion [mm³] (DIN 53516) | 100 | 97 | 94 | 86 |
| Rebound resilience at 23° C. [%] | 32.5 | 28.5 | 34 | 31 |
| Rebound resilience at 60° C. [%] | 55 | 59.5 | 62 | 62 |
| tan δ at 0° C. (dynamic damping at 10 Hz) | 0.350 | 0.430 | 0.452 | 0.486 |
| tan δ at 60° C. (dynamic damping at 10 Hz) | 0.112 | 0.097 | 0.100 | 0.094 |
| tan δ maximum (MTS amplitude sweep at 1 Hz, 60° C.) | 0.183 | 0.162 | 0.154 | 0.144 |

Tyre applications need low rolling resistance, and this is present when the values measured in the vulcanizate are: a high value for rebound resilience at 60° C., a low value for tan δ in dynamic damping at high temperature (60° C.) and a low value for tan δ maximum in the amplitude sweep. As can be seen from Table 2, the vulcanizate of Example 4 according to the invention features high rebound resilience at 60° C., a low tan δ value in dynamic damping at 60° C. and a low tan δ maximum in the amplitude sweep.

Tyre applications also need high wet-slip resistance, and this is present if the vulcanizate has a high tan δ value in dynamic damping at low temperature (0° C.). As can be seen from Table 2, the vulcanizate of Example 4 according to the invention features a high tan δ value in dynamic damping at 0° C.

Tyre applications moreover need high abrasion resistance. As can be seen from Table 2, the vulcanizate of Example 4 according to the invention features very low DIN abrasion.

What is claimed is:

1. A rubber mixture, comprising:

(A) at least one functionalized diene rubber having a polymer chain comprising repeat units based on 1,3-butadiene and styrene and functionalized using hydroxyl groups, carboxy groups, and/or salts thereof, wherein the 1,3-butadiene is present in an amount of from 40 to 100% by weight, the styrene is present in an amount of from 1 to 60%, and the proportion of bonded functional groups and/or salts thereof are from 0.02 to 5% by weight, all aforementioned weight based on the diene rubber, and (B) at least one XSBR-styrene/butadiene rubber gel comprising hydroxy groups in an amount of from 20 to 50 mg KOH/g and having a swelling index in toluene of from 1 to 25 and having a particle size of from 5 to 1000 nm; and (C) optionally, further rubbers, fillers and rubber auxiliaries.

2. The rubber mixture according to claim 1, wherein the proportion of the XSBR-styrene/butadiene rubber gel is from 5 to 75 parts by weight based on 100 parts by weight of the total amount of rubber of components (A), (B) and (C).

3. The rubber mixture according to claim 2, wherein the styrene/butadiene rubber gel is an XSBR-styrene/butadiene copolymer and graft polymer, comprising hydroxyethyl methacrylate, hydroxypropyl methacrylate, hydroxybutyl methacrylate, ethylene glycol dimethacrylate, trimethylolpropane trimethacrylate and/or pentaerythritol tetramethacrylate.

4. A process for the production of the rubber mixture according to claim 1, comprising:
mixing the at least one functionalized diene rubber with the at least one XSBR-styrene/butadiene rubber gel in a mixing apparatus at temperatures of from 20 to 220° C.

5. The process according to claim 4, further comprising:
mixing the at least one functionalized diene rubber with the one or more further rubbers, fillers, and rubber auxiliaries.

* * * * *